Dec. 10, 1957  J. G. McKINLEY  2,815,515
CUSHIONS AND METHOD FOR MANUFACTURING THE SAME
Filed Aug. 17, 1955

INVENTOR.
J. G. McKINLEY
BY
ATTORNEY

United States Patent Office 2,815,515
Patented Dec. 10, 1957

2,815,515

CUSHIONS AND METHOD FOR MANUFACTURING THE SAME

James G. McKinley, Waynesville, N. C., assignor to The Dayton Rubber Company, a corporation of Ohio Application August 17, 1955, Serial No. 529,015

1 Claim. (Cl. 5—341)

The present invention relates to resilient cushions and particularly to such as are composed of a cellular elastomeric material and are designed for use in connection with upholstered furniture or as bed pillows or the like.

With the advent of improved cellular elastomeric materials such as foam rubber, polyurethane foam, foamed polyvinyl chloride and the like, the shape of the pillow or cushion has come to depend upon the shape of the cellular elastomeric filler employed. In order to simulate the crowned effect of the previously employed down pillows and cushions stuffed with other upholstery filling material, it has been the practice in many cases to mold the cellular elastomeric cushion filler to have a gradual increase in thickness toward its center. In order to provide such a crowned surface, however, it has been necessary to employ considerably more material in the mold, and a deeper mold cavity has been required from which it has been more difficult to remove the pillow after completion of the molding operation. Furthermore, if the crown of the cushion is made to depend entirely upon the shape of the mold cavity, it is obvious that any slight variation in this crown will require a comparable variation in the mold. Since the needs of furniture and bedding manufacturers often demand variations in the crown of pillows or cushions which would otherwise be of the same dimensions and would require only one mold, it has long been desired to find a medium for varying the crown of cushions without necessitating a change in the molding requirements.

At the same time, because of the highly deformable nature of the cellular elastomeric materials normally employed in cushions of the type herein considered, it has been found impossible to employ any additional fillers or the like which would not deleteriously affect the cushioning properties. Furthermore, the incorporation of such material as upholstery padding and the like with the cellular elastomeric material has proven extremely difficult from the manufacturing standpoint.

It is accordingly an object of the present invention to provide a cushion characterized by a high crown or increase in thickness at the midportion thereof as compared with the edges thereof.

It is a further object of the present invention to provide such a cushion of cellular elastomeric material which will retain all of the desirable cushioning properties of such material.

It is yet a further object of the present invention to provide a method for the manufacture of crowned pillows and cushions which will not require extensive changes in producing cushions having varying crown heights.

To achieve these and other objects and advantages of the present invention which will be apparent from a reading of the following disclosure, the present invention provides for the formation of pillows in segments such as halves which may be subsequently joined together about a filler or insert sandwiched between these segments so as to hold the same apart thereby providing a crown or greater thickness at that portion of the pillow wherein the insert is provided. Since, however, the provision of such an insert or filler might deleteriously affect the smooth contour and/or the resilience of the cellular elastomeric material of which the cushion segments are composed, the present invention further provides for a critical and hitherto unknown manner of associating the insert within and to the remainder of the pillow. It is accordingly provided herein that the insert should be relatively thin and of substantially smaller broadside dimensions as compared with comparable dimensions of the cushion halves or segments. In order that the properties of the cellular elastomeric material of the cushion segments may be preserved in the final cushion assembly, it is preferred that the inserts thus provided be of a cellular elastomeric material the same as or similar to that employed in the cushion segments and that cored passages extend through the sheets thereof.

While, as explained above, the thickness of the pillow and the crown effect will be present wherever the fillers are inserted between the cushion halves, it is of course, desired that the crown should have a permanent location. It accordingly follows that it is necessary to join the insert to the pillow itself and the present invention provides a special manner for so doing that, once again, the properties of the cushion itself will not be deleteriously affected by the presence of the filler or the manner of its association therewith. This manner of association involves the joining of the filler to each of the pillow or cushion segments between which it is sandwiched. This joining, however, should be carefully limited to substantially spaced points on each surface of the insert. In order that the effect of the insert may not be too pronounced at one portion and too completely lacking in another, the present invention provides for a tapering or reduction in thickness of the insert near its marginal portion so that a gradual decline in the crown and the additional firmness of the insert will take place.

In joining the insert to the cushion segments near the marginal edges of the insert while at the same time providing that these marginal edges shall be of considerably less thickness than the central portion of the insert, there has arisen the problem of a deformation or "dimpling" of the outer surfaces of the cushion opposite the points at which the insert is joined thereto.

As a means of solving this problem applicant has invented a filler or insert which consists of two separate layers of the insert material, each of which is joined to the other at a mid-point of one of its broadside surfaces and each of which is then joined to a surface of the cushion segment at spaced points on the broadside surface of the sheet opposite that at which it is joined to the other sheet. As a further refinement of this basic concept, the present invention provides that the insert should consist of two rectangular sheets preferably of a cellular elastomeric material similar to that of the cushion halves with which it is to be associated which sheets are crossed so that the longer dimension of one is at right angles to the comparable dimension of the other. These sheets are then joined to each other at a central portion of their overlapping surfaces and each sheet is in turn associated or joined to the nearer of the cushion segments at the broadside surface thereof which is closer to such sheet. It has been found that such an insert so associated in a cushion not only provides the desired crown but also involves no detriment to the cushioning properties or shape of the finished cushion.

The invention thus generally described may be more clearly understood by reference to the following detailed description in connection with certain preferred embodiments thereof and to the appended drawings.

Figure 1:
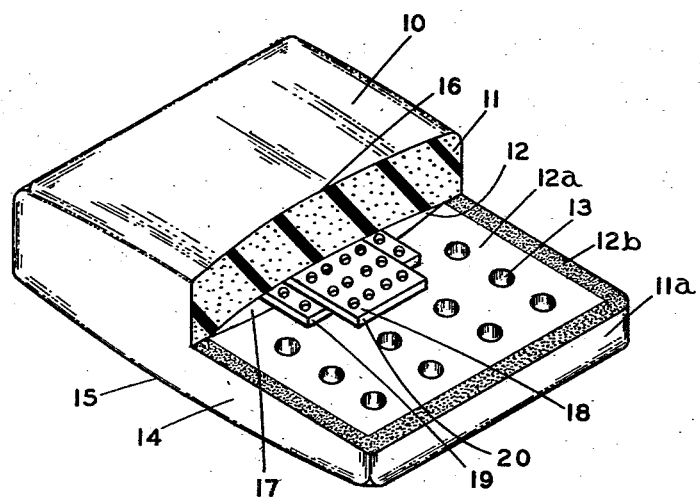
Figure 1 is a perspective partially broken away and in partial cross section of a cushion in the form of a bed pillow incorporating a novel insert of the present invention.

Referring now to Figure 1 the pillow 10 is shown to consist of two halves 11 and 11a of cellular elastomeric material. These halves or segments will be seen to have a broadside surface such as 12 and 12a which may or may not be characterized by the presence of cored depressions 13 opening thereon. The remainder of the block-like segment or half includes edges such as 14 and a second broadside surface which is usually a contoured surface as at 15. It is this contoured surface of the pillow or cushion which rises from a relatively small thickness near the edge of the pillow to a greater thickness at the center thereof to provide the crown 16.

It will be understood that the halves or segments of the cushion may be of any moldable composition suitable for cushioning and will include, as explained above, the broad range of cellular elastomeric materials commonly employed for such purposes. The term elastomeric employed herein is meant to include any material which at room temperature can be stretched repeatedly to at least twice its original length and upon immediate release of the stress will return with force to its approximate original length. Included within such category are foam rubber, foamed synthetic rubber such as polymers or copolymers of chloroprene, butadiene, styrene and acrylic nitrile, as well as the foamed plastic materials such as polyurethane, polyvinyl, polyamide, polyester and similar resins any of which may be compounded to have the qualities of flexibility, elasticity, resiliency, softness and the like, characteristic of cushioning materials.

The cushion segments of any of the material described above may be molded in the well-known manner depending upon the type of material employed; and, it is to be understood that the present invention is not involved with the choice of material or the manner of formation of such segments. Rather does this invention deal with the handling of these segments to provide a crowned pillow. The cushion segments are joined by a suitable adhesive, stitches or other convenient means at their broadside surfaces such as 12 and 12a to constitute the finished cushion. It will be understood that in order for the pillows to be symmetrical and to have a pleasing appearance, the broadside surface or some comparable surface of each cushion segment should have a companion surface on the other segment such that when these companion surfaces are joined a symmetrical integral unit will be involved. In the case of the illustration of Figure 1 the broadside surface 12 has a companion surface 12a such that when the segments 11 and 11a are joined at these surfaces, a symmetrical structure will result. Instead, however, of joining these segments at all points on the companion surfaces thereof, the joining is confined to spaced points and in the case of the preferred embodiment of Figure 1 to the marginal portion of the broadside surfaces such that a pocket 17 is provided. Within this pocket 17 is placed the insert or filler designated generally as 18 which in the preferred embodiment of Figure 1 is shown to consist of the two layers each of which is in the form of a rectangular sheet 19 and 20 of relatively small thickness.

Figure 2:
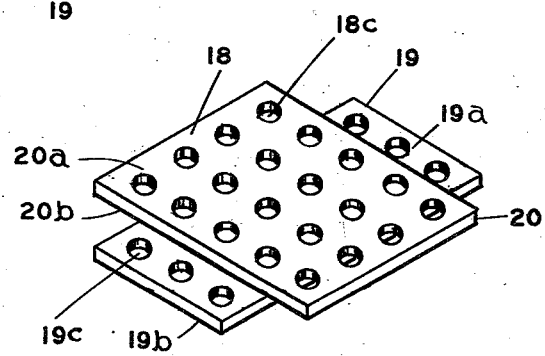
Figure 2 is a perspective of a preferred insert according to this invention.

The insert is shown more clearly in Figure 2 wherein the insert 18 appears as it would be shaped without the influences of the surrounding cushion segments to which it is joined in Figure 1. It will be seen that the rectangular sheets 19 and 20 are in a crossed position, that is with the longer dimension of the rectangular broadside surfaces of one sheet angularly disposed to that of the other sheet. As a result it may be observed that the insert itself consists of two thicknesses representing the sheets 19 and 20 at the central portion thereof but consists of only one thickness, that is only one of the sheets 19 or 20 around the periphery thereof. The sheets 19 and 20 are preferably joined to each other at the central portion of the contiguous broadside surfaces 19a and 20b in the area of their overlapping. The insert thus formed is then positioned in the pocket 17 formed by the pillow or cushion segment as shown generally in Figure 1. The sheet 19 is joined to the broadside surface 12a of the segment 11a at spaced points on its broadside surface 19b while the sheet 20 is joined to the broadside surface 12 of the segment 11 at its broadside surface 20a.

The insert is preferably relatively small as compared with the dimensions of the final cushion. For example, in a pillow of the type shown in Figure 1 measuring 24 inches in length, 16 inches in width and 2 inches in height at the edges, an insert consisting of the two crossed sheets 19 and 20 each measuring 6 inches in length, 4½ inches in width and ⅝ inch in thickness may be employed. To provide the desired crown this insert should be affixed to the segment 11 and 11a at substantially the center of the companion broadside surfaces 12 and 12a. The pocket 17 is preferably of dimensions conforming more nearly to the dimensions of the surfaces 12 and 12a as is the case where these surfaces are joined about their marginal portions as at 12b.

Figure 3:
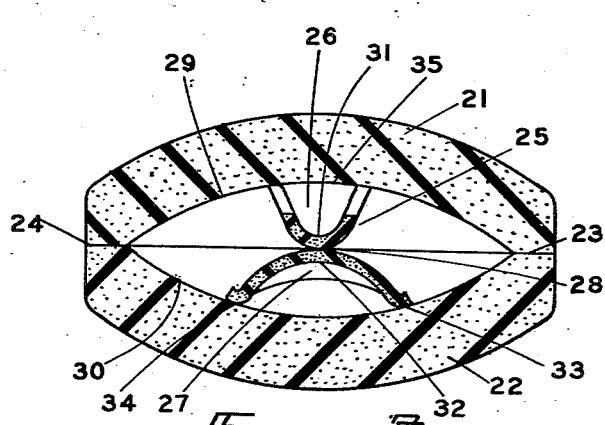
Figure 3 is a cross section through a conventional bed pillow incorporating the insert of the present invention showing a form of association of the insert with the pillow.

For a clearer understanding of the manner in which the insert is actually joined to the cushion segment, attention is directed to Figure 3 wherein the cellular elastomeric cushion segments 21 and 22, joined along their marginal portions as at 23 and 24 are shown as they would be pulled apart at the center of each. It is to be understood that the presence of the insert does not result in the exaggerated crown shown, but this exaggeration is for purposes of clarity and illustration only and reflects the manner in which the insert 25 would respond if the segments 21 and 22 were in fact forced apart by some external force. The insert 25 consists of the two rectangular sheets 26 and 27 similar to the sheets 19 and 20 of Figures 1 and 2. As explained above these sheets are joined to each other at their mid-portion 28 which is also at the center of their overlapping where each sheet has a broadside surface contiguous with the other. Each of the sheets 26 and 27 is in turn adhered to the nearest broadside surface such as 29 or 30 of the nearest pillow or cushion segment 21 and 22 respectively. The junction with the pillow takes place at spaced points on the broadside surface such as 31 and 32 of each sheet which is opposite that surface at which they are joined to each other.

In this preferred embodiment the sheets 26 and 27 are joined to the respective segments 21 and 22 along the marginal portions of the broadside surfaces 31 and 32 respectively of such sheets. This joining, however, is preferably further limited to the shorter edges of the rectangular sheets. Thus the sheet 27 which has its shorter edges lying longitudinally of the pillow is joined to the segment 22 along the longitudinally extending lines 33 and 34, while the sheet 26 which has its shorter edges extending transversely of the pillow is joined to the segment 21 along the transversely extending line 35. In joining the insert to the cushion segments as in the joining of the segments to each other any well-known suitable adhesive such as rubber cement, polyurethane or the like may be employed.

While the sheets 26 and 27 of Figure 3 are shown to be continuous sheets of the cellular elastomeric material, it is often preferred that these insert sheets should be provided with passages such as 19c and 18c in Figure 2 extending through the sheets 19 and 20 respectively. These openings may be in the form of cored depressions such as are shown opening upon the surface 12a in Figure 1. These depressions or passages are provided in the original molding of the sheets by the placement of cores extending through the cellular elastomeric material at the time it is vulcanized or cured. The provision of these cored passages through the sheet employed as the insert or filler not only reduces the weight and cost of the resultant product, but also lends an unexpected and hitherto unobvious improvement to the pillow as a whole in that the presence of the passages through the insert sheets 19 and 20 still more efficiently conceals the presence of the insert within the pillow half so that the finished product has a greater and a more uniform resilience and has a smooth and continuous sloping or tapering from the crown portion to the edges thereof. As a result, when cored passages are present in the sheets employed as the filler or insert according to the other teachings of this invention, a uniformly crowned resilient pillow wherein the presence of the insert therewithin is completely concealed both to the touch and to the eye is achieved.

While the present invention has been described in connection with certain specific embodiments, this description does not limit the scope of the invention as set forth in the subjoined claims.

I claim:

As an article of manufacture a crowned cushion comprising two cellular elastomeric cushion halves each having a broadside surface of substantially equal dimensions and joined to the other along the edges of said surface, a pocket defined by said surfaces and the joined edges thereof, and an insert of crossed cellular elastomeric rectangular sheets of substantially smaller dimensions than the broadside surfaces of said halves held in their crossed relationship within said pocket whereby the body of the insert consists of two thicknesses of the cellular elastomeric sheets while the edges thereof are of only one such thickness, said rectangular sheets joined to each other near the center of their overlapped portion and to the nearer cushion half at substantially spaced points on their broadside surface opposite that at which they are joined to each other.

References Cited in the file of this patent

UNITED STATES PATENTS

| | | |
|---|---|---|
| 1,389,715 | Van Gelder | Sept. 6, 1921 |
| 2,619,659 | Futternecht | Dec. 2, 1952 |

FOREIGN PATENTS

| | | |
|---|---|---|
| 376,937 | Great Britain | July 21, 1932 |
| 389,833 | Great Britain | Mar. 20, 1933 |
| 709,641 | France | May 20, 1931 |